United States Patent Office 3,407,743
Patented Oct. 29, 1968

3,407,743
ROTARY PRESSURE-FLUID MACHINES
Jean Florent Francois Marcel Robert Landreau, Quai du Hallage, Fontenay-le Comte, Vendee, France
Filed Oct. 4, 1966, Ser. No. 584,150
Claims priority, application France, July 25, 1966, 70,638
4 Claims. (Cl. 103—159)

ABSTRACT OF THE DISCLOSURE

A rotary pressure-fluid machine in which a plurality of piston-cylinder units are arranged star-fashion about a crankshaft rotating in machine flanges, each cylinder being oscillatable mounted in said flanges by means of an inlet crankpin and an exhaust crankpin, said crankpins having axes parallel to the crankshaft axis. Each cylinder crankpin is provided with an orifice acting as a fluid-passageway and extending to the peripheral surface of the crankpin, seals being positioned on either side of each orifice while an assembling and positioning ring is placed between one of said seals and the end of each cylinder crankpin. A decompression opening is formed in the end of each such cylinder crankpin and is so dimensioned and positioned as to prevent pressure build-up between the cylinder crankpins and the machine flanges.

---

Already well known are rotary pressure-fluid machines usable as motors or pumps, which comprise a plurality of oscillating cylinders mounted star-fashion about a crankshaft rotating in bearings housed in flanges. The cylinders are oscillatably mounted in the flanges through the agency of crankpins having their axes parallel to that of the crankshaft. The ends nearest the crankshaft axis of the pistons which slide through the cylinders are cylindrically-shaped and bear against an associated cylindrical crankpin of the crankshaft. Further, the fluid-pressure intake into each cylinder is effected by means of a timing system which includes, in respect of each cylinder, an inlet port embodied in a cylinder inlet crankpin, though not coaxially therewith, and an associated timing tract formed in the bearing thereof. Similary, the fluid-pressure outlet, in respect of each cylinder, is effected by means of an exhaust system comprising an exhaust port formed in a cylinder exhaust crankpin, though not coaxially therewith, and this port cooperates with a exhaust tract formed in the exhaust crankpin bearing. As the cylinders oscillate, the different crankpin ports register or not with the bearing tracts.

In such known rotary machines, the crankpins of the various cylinders are rigid with the latter and are carried in bearings housed in the flanges or sideplates of the machine. Furthermore, the inlet crankpin ports extend via the inlet tracts into an annular groove formed in a flange, while the exhaust crankpin ports communicate similarly via the exhaust tracts with an annular exhaust groove formed in another flange. The end of each piston that is nearest the crankshaft axis carries a bearing-shell, preferable made of bronze.

Such machines have the following disadvantages: firstly, pressure-fluid leaks occur between the cylinder inlet and exhaust crankpins and their bearings, thereby reducing the volumetric efficiency of the machine; secondly, friction of the bearing shells against the crankshaft crankpin is considerable and reduces the mechanical efficiency of the motor or pump.

It is an object of the present invention to overcome such drawbacks caused by leaks and friction, and to thereby increase the volumetric and mechanical efficiency of the machine.

The invention relates to improvements in pressure-fluid type rotary machines, consisting in providing sealing and positioning members for each cylinder crankpin, in providing an enclosure which is applied against the machine flanges, and in inserting an antifriction bearing between the inner ends of the piston and the crankshaft crankpin against which is piston ends bear.

In accordance with the present invention, sealing and positioning means are placed between the inlet and exhaust crankpins of each cylinder and the flanges in which they are carried. Such sealing means may consist, for instance, of O-rings surrounding the crankpins. Where the crankpin inlet and exhaust ports have axes lying in planes perpendicular to the crankshaft axes, i.e. extending to the lateral cylindrical surfaces of the crankpins and not to their flat ends, a sealing element is placed at each end of the port.

Between the sealing element nearest the free end of the crankpin, and that same end, may be placed any convenient assembling and positioning element such as a ring. This permits balancing of the crankpins and ensures excellent fluid-tightness. Further, in the event of failure of the cylinder crankpin seals, a decompression hole avoids unduly high pressure to develop between the crankpins and the end-face of the flanges and makes it possible to drain the pressure fluid and thereby prevent the crankpins from acting as pistons, thus avoiding accidental explosion of the engine.

An enclosure is additionally provided over the flanges, using suitable securing and sealing means such as O-rings, in order to collect possible leaks occuring at whichever of the inlet or exhaust crankpin ends is rigidly connected to the cylinder. This enclosure also keeps out extraneous matter which could hinder operation of the machine; in this way, the latter can run with advantage in oil.

It is preferable to construct the enclosure in two half-sections enveloping the flanges and applied against each other along a plane perpendicular to the crankshaft axis by means of known securing and sealing means such as threaded rods and nuts and a sealing washer.

Finally, an antifriction bearing is inserted between each piston end nearest the crankshaft axis and the crankpin upon which it bears. This bearing is preferably a needle-bearing.

In order to permit easy fitting of the antifriction bearing, the crankshaft is designed in two parts, of which one comprises the crankpin adapted to receive the antifriction bearing and the other is secured to said crankpin and also to rotate on a bearing housed in one of the flanges. The two crankshaft sections may be interconnected in any convenient way, for instance by means of screws having their heads sunk in either section or in both sections by being driven thereinto in opposite directions.

The crankshaft may be either symmetrical in relation to the plane containing the piston axes, or asymmetrical and terminate against the wall of a flange, in which case the crankshaft would project only on one side of the machine.

The description which follows with reference to the accompanying non-limitative exemplary drawings will give a clear understanding of how the invention can be carried into practice.

In the drawings:

FIGURE 1 illustrates a machine which, in this particular form of embodiment, is a five cylinder engine.

Figure 2:
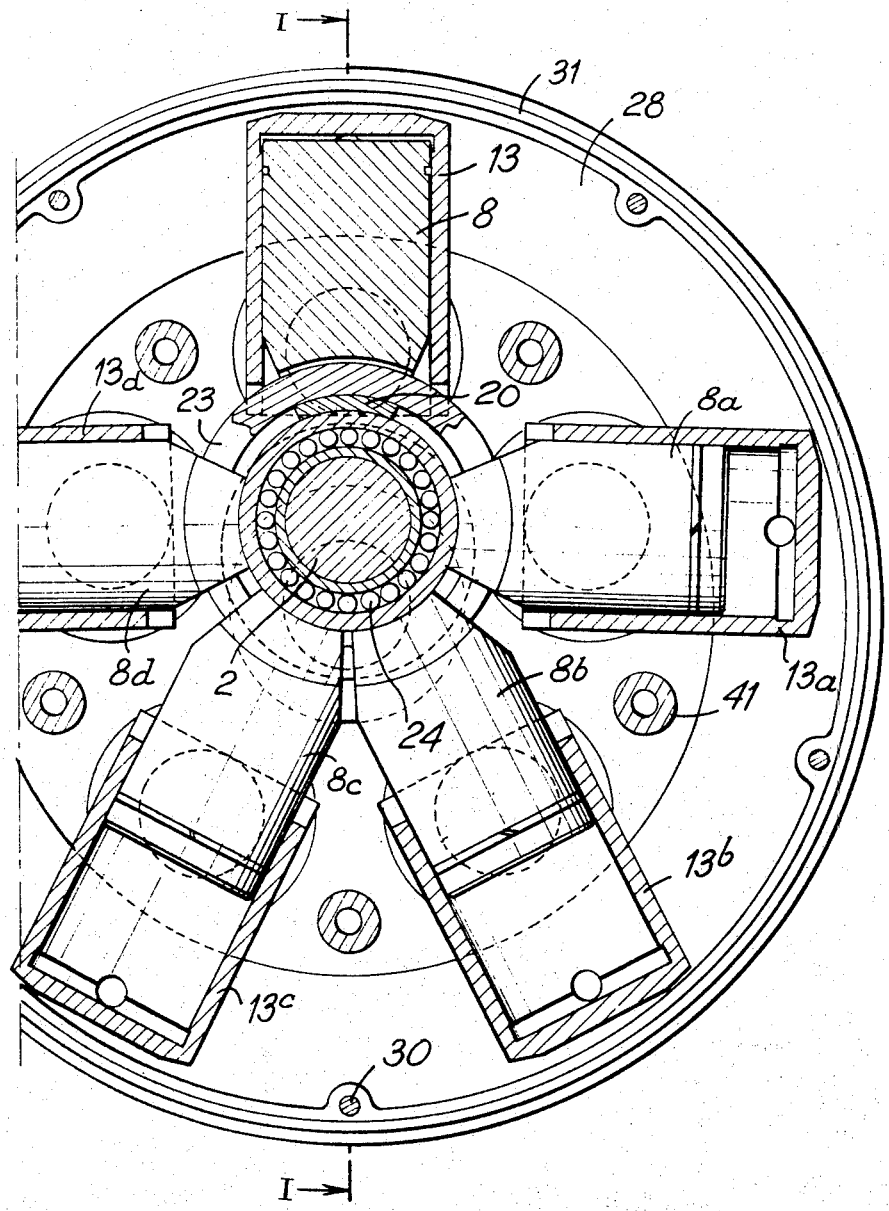
FIGURE 2 is a sectional view along the line II—II of FIGURE 1.

A crankshaft 1, which receives the motive power via a crankpin 2, is mounted in lateral flanges 3, 4, being supported therein by bearings 5, 6 and 7. Bearings 5 and 6 are roller-bearings and bearing 7 is a ball-bearing. Motive power is provided by five pistons 8, 8a, 8b, 8c and 8d impelled by pressure-fluid. These pistons are represented in FIGURE 2 and slide respectively in cylinders 13, 13a, 13b, 13c and 13d.

These cylinders oscillate respectively about an axis common to two crankpins rigidly connected to them. Thus, cylinder 13 containing piston 8 oscillates through the medium of an inlet crankpin 14 and an exhaust crankpin 15, supported respectively in flanges 3, 4 in antifriction bearings 16, 17.

In accordance with this invention, the sealing and positioning of crankpins 14, 15 is effected by means of two O-rings 18 and an assembling and positioning ring 19 for each crankpin.

On their ends proximate the crankshaft axis, the pistons carry inserts, as designated by reference numeral 20 in the case of piston 8. Preferably, this insert is made of bronze and is secured to the associated piston by countersunk screws 21. An annular groove 22 is formed in each piston, or, in this particular instance, within each insert whereby to receive a common ring 23 coaxial with crankshaft crankpin 2. This ring may be fixed, for example, to one of the pistons only by means of screws.

The end inserts as at 20 are formed, at the crankpin end, with cylindrical surfaces matching the outer surface of a needle-bearing 24 positioned on crankpin 2.

Figure 1:
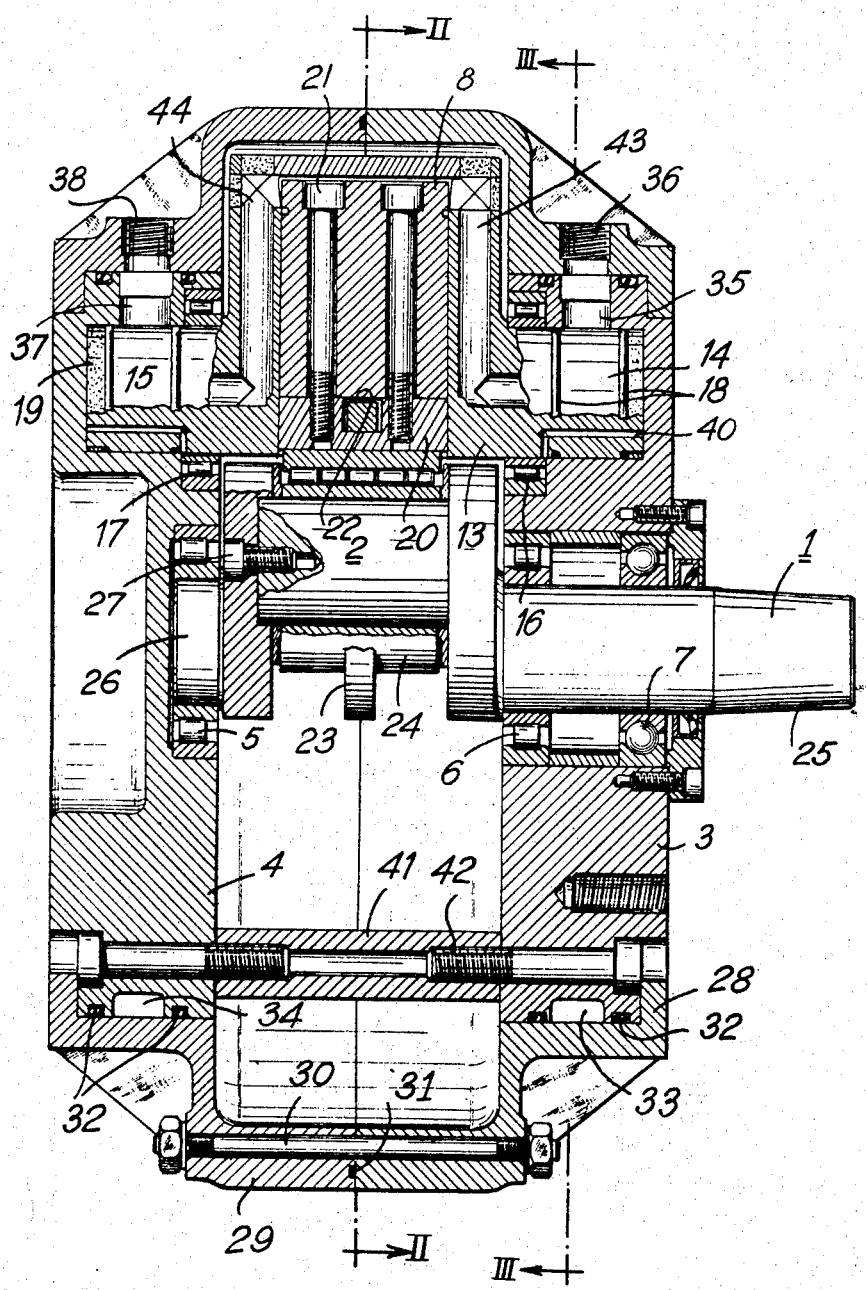
FIGURE 1 is a sectional view on the line I—I of FIGURE 2, with a partial external representation of the crankpins of one cylinder of a pressure-fluid motor according to the invention.

The crankshaft shown in FIGURE 1 is asymmetrical and consists of two sections 25, 26 assembled together by suitable securing means 27. Section 25 of crankshaft 1 comprises the crankpin 2 carrying antifriction bearing 24 and is supported in antifriction bearings 6, 7, while crankshaft section 26 is supported in antifriction bearing 5.

In accordance with the invention, an enclosure is provided to envelop the two flanges 3, 4. In this particular constructional form, the enclosure consists of two half-enclosures 28, 29 secured together, for example, by nuts and a threaded stud, as at 30, and applied against each other along the plane containing the piston axes, using an interposed gasket 31. Two O-rings 32 are fitted in place on applying each of half-enclosures 28, 29 against the respective flanges 3, 4. O-rings 32 are positioned on either side of annular grooves 33, 34 coaxial with the crankshaft and formed respectively in flanges 3, 4.

Annular timing groove 33 communicates, first, with five inlet tracts as at 35, which extend to the outer surface of the associated inlet crankpins, as at 14, and, second, with an inlet orifice 36 formed in half-enclosure 28. Similarly, annular exhaust groove 34 communicates both with the five exhaust tracts, as at 37 in the case of crankpin 15, and with an exhaust orifice 38 formed in half-enclosure 29.

Figure 3:
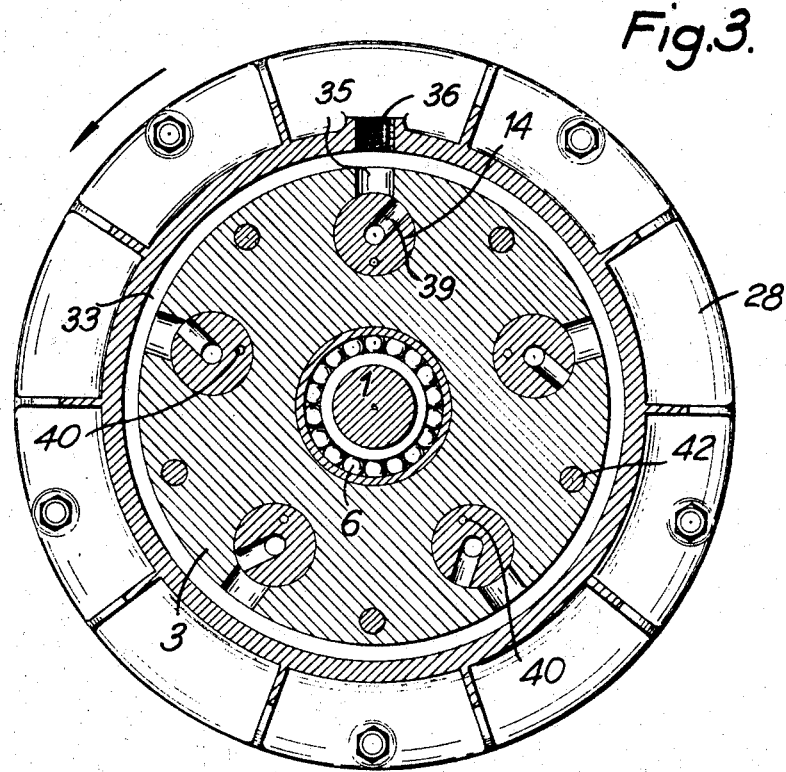
FIGURE 3 is a sectional view along the line III—III of the motor in FIGURE 1.

As is clearly shown in FIGURE 3, the inlet and exhaust crankpins of each cylinder respectively embody an inlet port 39 and a differently orientated exhaust port, whereby they register at intervals with the corresponding inlet or exhaust tracts 35 and 37 respectively. A decompression hole 40 formed in each crankpin 14, 15 enables pressure fluid to be drained and prevents the crankpins from acting as pistons in the event of failure of the seals.

Spacers 41 are used for positioning the two flanges by means of screws 42, as shown in FIGURES 1 and 3.

When the crankshaft rotates in the direction of the arrow in FIGURE 3, each cylinder first oscillates in the opposite direction to said arrow for the first half-revolution of the crankshaft, during which the associated inlet port and inlet tract register while the exhaust port and exhaust tract are out of register. Then, as the crankshaft rotates through a further half-revolution, the exhaust port and exhaust tract of that same cylinder register, whereas the inlet path thereinto is closed.

Figure 4:
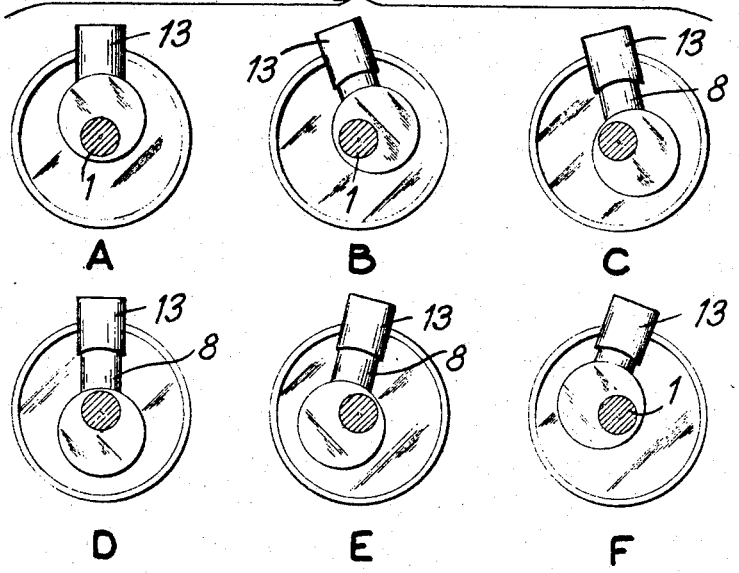
FIGURE 4 shows diagrammatically the consecutive phases in the motion of a cylinder-piston assembly of the subject motor of the invention.

A motor devised as hereinabove operates in the following manner: referring to FIGURE 4, it is proposed to consider cylinder 13 in the top dead center position 4A: responsively to the cylinders operating as driving cylinders, or to momentum if the engine is already spinning, cylinder 13 begins to tilt in the opposite direction to the arrow in FIGURE 3, towards position B in FIGURE 4. The inlet path is then open and fluid under pressure enters through orifice 36, annular timing groove 33, inlet tract 35, inlet port 39, and a conduit 43 within the cylinder, and thrusts against the substantially flat surface of piston 8 which in turn exerts upon crankshaft 1 a driving torque which rotates it in the direction of the arrow.

The crankshaft continues to rotate until cylinder 13 reaches the position shown in FIGURE 4C, the inlet path continuing to remain open. The bottom dead center position shown in FIGURE 4D is then reached, beyond which the cylinder begins to tilt in the opposite direction as the crankshaft rotates through a further half-revolution. In position 4E, the inlet path is closed, the exhaust path open, and the fluid flows along a conduit 42 within the cylinder, through the exhaust port (not shown in the figures), exhaust tract 37, groove 34 and orifice 38. The cylinder reaches its position of maximum inclination in FIGURE 4F, then reverts to the position in FIGURE 4A, both the inlet and exhaust paths being then closed.

The same cycle is repeated at each crankshaft revolution for cylinder 13 and, in turn, for the remaining four cylinders.

It goes without saying that many changes and substitutions of parts may be made to the specific form of embodiment hereinbefore described without departing from the scope of the invention. More particularly, the subject machine of the invention may be designed as a pump, with the mechanical force being then transmitted from the crankshaft to the piston. Any convenient number of pistons may be used, and changes may be made to the crankshaft configuration or to the method of securing its various component parts.

What I claim is:

1. A rotary pressure-fluid machine comprising a crankshaft, machine flanges including bearings rotatably supporting said crankshaft, a plurality of cylinders arranged star-fashion about said crankshaft, an inlet crankpin and an exhaust crankpin for each cylinder having axes parallel to the crankshaft axis and supporting said cylinder for oscillatory movement about their axes, pistons slidably mounted in said cylinders and having inner ends, said crankshaft including a crankpin acting on the inner ends of said pistons to produce reciprocal movement of the pistons in said cylinders, sealing means associated with each crankpin of each cylinder and positioned on either side of an inlet orifice formed in each inlet crankpin and opening at the periphery thereof and on either side of an exhaust orifice formed in each exhaust crankpin and opening at the periphery thereof, positioning means associated with the cylinder crankpin and including assembling and positioning rings for each cylinder placed between one of said sealing means of each crankpin and the end of each cylinder crankpin, and decompression means at the end of each cylinder crankpin for preventing pressure build-up between the cylinder crankpins and said flanges.

2. A rotary machine according to claim 1 comprising inserts at said inner ends of said pistons, countersunk fasteners in said pistons securing the inserts to the inner ends of said pistons, a cylindrical bearing on said crankpin of the crankshaft, and a ring connecting said inserts together.

3. A rotary machine according to claim 1, wherein said crankshaft comprises two sections secured together and each of which is supported in a flange through a corresponding bearing, the first section including said crankpin and a bearing mounted thereon.

4. A rotary machine according to claim 1, wherein each said sealing means is an O-ring.

References Cited

UNITED STATES PATENTS

| 1,159,613 | 4/1914 | Sundh | 91—213 |
| 1,498,648 | 6/1924 | Dumond | 103—159 |
| 1,925,333 | 9/1933 | McCarthy | 230—175 |
| 2,151,402 | 3/1939 | Burch | 230—175 |
| 2,621,607 | 12/1952 | Trapp | 103—174 |
| 2,709,408 | 5/1955 | Orshansky | 103—174 |
| 2,760,439 | 8/1956 | Crookston | 103—159 |

WILLIAM L. FREEH, *Primary Examiner.*